(12) United States Patent
Radocchia et al.

(10) Patent No.: US 11,107,088 B2
(45) Date of Patent: Aug. 31, 2021

(54) OPEN REGISTRY FOR INTERNET OF THINGS

(71) Applicant: Chronicled, Inc., San Francisco, CA (US)

(72) Inventors: Samantha Radocchia, San Francisco, CA (US); Ryan Orr, Brisbane, CA (US); David Aho, New York, NY (US); Maurizio Greco, San Francisco, CA (US)

(73) Assignee: Chronicled, Inc., San Francisco, CA (US)

( * ) Notice: Subject to any disclaimer, the term of this patent is extended or adjusted under 35 U.S.C. 154(b) by 467 days.

(21) Appl. No.: 15/605,683

(22) Filed: May 25, 2017

(65) Prior Publication Data

US 2017/0345019 A1    Nov. 30, 2017

Related U.S. Application Data

(63) Continuation-in-part of application No. 15/173,461, filed on Jun. 3, 2016.
(Continued)

(51) Int. Cl.
*G06Q 20/40* (2012.01)
*G06Q 30/02* (2012.01)
(Continued)

(52) U.S. Cl.
CPC ... *G06Q 30/0185* (2013.01); *G06K 19/07798* (2013.01); *G06Q 10/087* (2013.01);
(Continued)

(58) Field of Classification Search
CPC ....... G06Q 30/00–08; G06Q 19/00–18; G06Q 10/00–30; G06Q 50/00–34;
(Continued)

(56) References Cited

U.S. PATENT DOCUMENTS 6,226,619 B1   5/2001  Halperin
8,271,381 B2   9/2012  O'Brien et al.
(Continued)

FOREIGN PATENT DOCUMENTS

CN   101951371 A   6/2015
CN   102779284 A   6/2015
(Continued)

OTHER PUBLICATIONS

Andreas M. Antonopoulos, Mastering Bitcoin, O'Reilly Media Inc., Apr. 2014 (Year: 2014).*
(Continued)

*Primary Examiner* — John W Hayes
*Assistant Examiner* — Chenyuh Kuo
(74) *Attorney, Agent, or Firm* — Haverstock & Owens LLP

(57) ABSTRACT

An identity system for the Internet of Things (IOT) that enables users and machines to identify, authenticate and interact with products and collectibles without relying on a third-party-controlled authentication service. The system includes wireless tamperproof tags coupled to products and an open registry database where a chain of ownership of the items is able to be stored. The open registry enables public access to the item identity and data combined with item registration anonymity.

6 Claims, 9 Drawing Sheets

Related U.S. Application Data

(60) Provisional application No. 62/342,850, filed on May 27, 2016.

(51) Int. Cl.

| | | |
|---|---|---|
| *G06Q 20/32* | (2012.01) | |
| *G06Q 20/34* | (2012.01) | |
| *G06Q 20/38* | (2012.01) | |
| *G06Q 30/00* | (2012.01) | |
| *G06Q 10/08* | (2012.01) | |
| *H04L 9/14* | (2006.01) | |
| *H04L 9/32* | (2006.01) | |
| *H04W 12/10* | (2021.01) | |
| *H04L 29/06* | (2006.01) | |
| *H04W 12/08* | (2021.01) | |
| *H04W 12/06* | (2021.01) | |
| *G06K 19/077* | (2006.01) | |
| *G06Q 50/28* | (2012.01) | |
| *H04W 4/70* | (2018.01) | |
| *H04W 4/80* | (2018.01) | |
| *H04L 29/08* | (2006.01) | |
| *H04W 12/63* | (2021.01) | |

(52) U.S. Cl.
CPC ....... *G06Q 10/0833* (2013.01); *G06Q 30/018* (2013.01); *G06Q 50/28* (2013.01); *H04L 9/14* (2013.01); *H04L 9/3239* (2013.01); *H04L 9/3247* (2013.01); *H04L 63/104* (2013.01); *H04W 12/06* (2013.01); *H04W 12/08* (2013.01); *H04W 12/10* (2013.01); *G06K 19/07758* (2013.01); *G06Q 2220/00* (2013.01); *H04L 67/12* (2013.01); *H04L 2209/38* (2013.01); *H04L 2209/80* (2013.01); *H04W 4/70* (2018.02); *H04W 4/80* (2018.02); *H04W 12/63* (2021.01)

(58) Field of Classification Search
CPC ...... G06Q 2220/00–18; H04L 9/00–38; H04L 63/00–308; H04L 2209/00–88; H04W 12/00–80; H04W 4/00–90; G06K 19/00–086
See application file for complete search history.

(56) References Cited

U.S. PATENT DOCUMENTS

| | | | |
|---|---|---|---|
| 8,370,491 B1 | 2/2013 | Breau et al. | |
| 8,371,501 B1 | 2/2013 | Hopkins | |
| 8,543,411 B2* | 9/2013 | Koster | G16H 20/13 |
| | | | 705/2 |
| 9,553,850 B2* | 1/2017 | Bosko | G06Q 99/00 |
| | | | 705/38 |
| 2004/0060976 A1 | 4/2004 | Blazey et al. | |
| 2004/0066278 A1 | 4/2004 | Hughes et al. | |
| 2005/0049979 A1 | 3/2005 | Collins | |
| 2006/0082438 A1 | 4/2006 | Bazakos et al. | |
| 2006/0173896 A1 | 8/2006 | Lyon | |
| 2006/0230276 A1 | 10/2006 | Nochta | |
| 2007/0038873 A1* | 2/2007 | Oliveira | H04N 21/64322 |
| | | | 713/193 |
| 2007/0095903 A1 | 5/2007 | Suenbuel | |
| 2007/0130070 A1 | 6/2007 | Williams | |
| 2007/0273558 A1 | 11/2007 | Smith et al. | |
| 2008/0223275 A1 | 9/2008 | Kishi et al. | |
| 2009/0031071 A1* | 1/2009 | Chiu | G06F 16/9554 |
| | | | 711/100 |
| 2009/0167489 A1 | 7/2009 | Nan et al. | |
| 2010/0005299 A1 | 1/2010 | Wase | |
| 2010/0060431 A1 | 3/2010 | Stevenson et al. | |
| 2010/0238002 A1* | 9/2010 | Ryan | H04Q 9/00 |
| | | | 340/10.52 |
| 2010/0325427 A1 | 12/2010 | Ekberg et al. | |
| 2011/0078549 A1* | 3/2011 | Thueringer | H04L 9/002 |
| | | | 714/807 |
| 2012/0032805 A1 | 2/2012 | Brodzik et al. | |
| 2012/0127976 A1 | 5/2012 | Lin et al. | |
| 2013/0019284 A1 | 1/2013 | Pacyga | |
| 2014/0108258 A1 | 4/2014 | Williams | |
| 2014/0136431 A1 | 5/2014 | Dahod et al. | |
| 2014/0266591 A1 | 9/2014 | Klammer et al. | |
| 2014/0282974 A1* | 9/2014 | Maher | H04L 9/3271 |
| | | | 726/7 |
| 2014/0286491 A1* | 9/2014 | Atherton | H04W 12/06 |
| | | | 380/270 |
| 2015/0039470 A1 | 2/2015 | Crites | |
| 2015/0134552 A1* | 5/2015 | Engels | H04L 9/3297 |
| | | | 705/318 |
| 2016/0085955 A1 | 3/2016 | Lerner | |
| 2016/0098730 A1 | 4/2016 | Feeney | |
| 2016/0162897 A1 | 6/2016 | Feeney | |
| 2016/0164884 A1 | 6/2016 | Sriram et al. | |
| 2016/0192188 A1 | 6/2016 | Coulier | |
| 2016/0253622 A1* | 9/2016 | Shram | H04L 63/126 |
| | | | 713/179 |
| 2016/0300234 A1 | 10/2016 | Moss-Pultz | |
| 2016/0321654 A1 | 11/2016 | Lesavich et al. | |
| 2016/0330034 A1 | 11/2016 | Back et al. | |
| 2016/0358158 A1 | 12/2016 | Radocchia et al. | |
| 2016/0358184 A1 | 12/2016 | Radocchia et al. | |
| 2016/0358186 A1 | 12/2016 | Radocchia et al. | |
| 2016/0358187 A1 | 12/2016 | Radocchia et al. | |
| 2017/0149796 A1 | 5/2017 | Gvili | |
| 2017/0300928 A1 | 10/2017 | Radocchia et al. | |
| 2017/0352012 A1 | 12/2017 | Hearn et al. | |
| 2017/0366347 A1 | 12/2017 | Smith | |
| 2018/0012311 A1 | 1/2018 | Small | |
| 2018/0019872 A1 | 1/2018 | Radocchia et al. | |
| 2018/0032759 A1 | 2/2018 | Radocchia | |
| 2018/0053161 A1 | 2/2018 | Bordash | |
| 2018/0108024 A1 | 4/2018 | Greco | |
| 2018/0211718 A1 | 7/2018 | Heath | |
| 2018/0264347 A1 | 9/2018 | Tran | |

FOREIGN PATENT DOCUMENTS

| | | |
|---|---|---|
| CN | 102955958 A | 6/2015 |
| WO | 9419770 A1 | 9/1994 |
| WO | 2004036802 A1 | 4/2004 |

OTHER PUBLICATIONS

International Search Report dated Jun. 7, 2019 for Application No. PCT/US2019/021485.
International Search Report and Written Opinion dated Oct. 10, 2018 from International Application No. PCT/US18/44609.
International Preliminary Report on Patentability from PCT Application No. PCT/US2016/035902, dated Dec. 14, 2017.
International Search Report and Written Opinion from International Application No. PCT/US2017/056791.
The International Preliminary Report on Patentability dated May 2, 2019 for Application No. PCT/US2017/056791.
International Search Report and Written Opinion for PCT Application No. PCT/US17/55605.
Melanie Swan, "Blueprint for a New Economy", Feb. 8, 2015, XP055279098, ISBN:978-1-4919-2049-7.
The European search report for the EP application 16 80 4599 dated Nov. 29, 2018.
International Search Report from PCT/US16/035902 dated Oct. 26, 2016.
International Search Report and Written Opinion from International Application No. PCT/US17/54004.
International Preliminary Report and Written Opinion dated Feb. 13, 2020 from International Application No. PCT/US2018/044609.
The European Office Action dated Mar. 6, 2020 from European Application No. 16804599.5.

(56) References Cited

OTHER PUBLICATIONS

The Chinese Office Action dated Jul. 30, 2020 from Chinese Patent Application No. 2016800460074.
Bruce Schneier, Applied Cryptography, 1996, John Wiley & Sons, Inc. 2nd Edition, Chapters 1.1,4.9 (Year 1996).
The International Preliminary Report for the International application PCT/US2019/021485 dated Sep. 24, 2020.

* cited by examiner

US 11,107,088 B2

OPEN REGISTRY FOR INTERNET OF THINGS

RELATED APPLICATIONS

This application claims priority under 35 U.S.C. § 119(e) of the U.S. provisional patent application Ser. No. 62/342,850, filed May 27, 2016, and titled "USING PROOF OF PROXIMITY TO SERVE-UP PRIVATE DATA ABOUT PHYSICAL OBJECTS IN THE CONSUMER INTERNET OF THINGS, AND TO SUPPORT AND VERIFY PROVABLE LOGISTICS, SOCIAL, ECOMMERCE, AND SECONDARY MARKET TRANSACTIONS BETWEEN A HUMAN AND A SMART PRODUCT," and is a continuation-in-part of the co-pending U.S. patent application Ser. No. 15/173,461, filed Jun. 3, 2016, and titled "OPEN REGISTRY FOR IDENTITY OF THINGS," both of which are hereby incorporated by reference.

FIELD OF THE INVENTION

The present invention relates to the field of the unique identity of things, including products, collectables and identity/internet of things devices. More particularly, the present invention relates to identification, authentication and provenance tracking using identifying tags and an open registry.

BACKGROUND OF THE INVENTION

Physical assets are poorly represented on the Internet, public databases or marketplaces. Current identification methods are often not machine-readable. Also, existing tags are not secure as they are able to easily be forged and/or re-applied to a different non-authentic asset. In particular, technologies that help prevent the duplication of tags are weak and rely on obfuscation methods (which can be hacked) or require the use of private databases (e.g. privately controlled) which rely on trusting a third party (e.g. the controlling party) to accurately maintain the database. Such methods do not prevent the third party from creating duplicate tags or database records, nor are they able to exist if/when the third party dissolves or goes out of business. Finally, such a third party controlled system lacks the ability for users to seamlessly migrate their identity and/or proof of ownership to other systems.

SUMMARY OF THE INVENTION

An identity verification and authentication system that enables users and machines to assign and authenticate the identity of things without relying on a third-party-controlled identity verification or authentication service. Things are any physical object, including products, collectables and identity of things devices. The system includes wireless tamperproof tags coupled to things and an open registry database where a chain of ownership of the things is able to be stored. The open registry enables public access to the identification data with optional item registration anonymity. In some embodiments, the open registry is a database, a blockchain or a smart contract.

A first aspect is directed to an internet of things (IoT) system. The system comprises one or more physical items each having an identity tag coupled to the item, the identity tags each storing a private key and a unique identifier, a mobile device configured to wirelessly read the unique identifier from one or more of the identity tags when proximate to the one or more of the tags, a network accessible location storing a plurality of groups of content associated with the item, wherein each group of the plurality of groups has a different access requirement such that the network accessible location blocks access to the group unless the access requirement of the group has been satisfied and a blockchain storing the unique identifier, a network accessible location identifier and a public key for each of the items, wherein the public key is associated with the private key stored on the identity tag coupled to the item and the network accessible identifier identifies the network accessible location. In some embodiments, the different access requirements comprise authentication of the item, proof of possession of the item and proof of proximity to the item. In some embodiments, satisfying the authentication of the item comprises with the mobile device reading the unique identifier of the identity tag of one of the items, generate and transmit a challenge message to the identity tag, transmit the unique identifier to the blockchain and access the public key associated with the unique identifier from the blockchain, receive a digital signature from the identity tag and authenticating the item if the digital signature was generated by the private key stored in the identity tag using the accessed public key. In some embodiments, upon receiving the challenge message the identity tag is configured to digitally sign the challenge message thereby generating the digital signature based on the private key stored in the identity tag and transmit the digital signature to the mobile device. In some embodiments, satisfying the proof of proximity to the item comprises automatically wirelessly reading the unique identifier from the identity tag with the mobile device when proximate to the tag, determining from the blockchain the network accessible location identifier associated with the unique identifier read from the tag with the mobile device, attempting to access the network accessible location with the mobile device based on the network accessible location identifier, generating and transmitting a proximity challenge to the mobile device with the network accessible location, forwarding the proximity challenge from the mobile device to the identity tag coupled to the item, generating and transmitting to the mobile device a digital signature of the proximity challenge with the identity tag using the private key, forwarding the digital signature from the mobile device to the network accessible location and determining that the proof of proximity is satisfied by verifying the validity of the digital signature with the network accessible location if the digital signature was generated by the private key stored in the identity tag using the public key. In some embodiments, satisfying the proof of possession of the item comprises satisfying the access requirement of the proof of proximity to the item a plurality of times over a predetermined time period. In some embodiments, the network accessible location is a cloud server provides cloud services related to the item including information about the item or programs related to the item. In some embodiments, the cloud server is provided by an entity that uploaded the unique identifier and the public key to the blockchain. In some embodiments, the cloud server is provided by a third party appointed by an entity that uploaded the unique identifier and the public key to the blockchain. In some embodiments, the cloud server is a smart contract running on a blockchain database.

A second aspect is directed to a mobile device for use in an internet of things (IoT) system. The mobile device comprises a wireless signal transceiver for communicating data wirelessly between the mobile device and one or more identity tags each coupled to one of one or more physical items, the identity tags each storing a private key and a unique identifier, a network interface for communicating with a blockchain and a network accessible location, the blockchain storing the unique identifier, a network accessible location identifier and a public key for each of the items, wherein the public key is associated with the private key stored on the identity tag coupled to the item, the network accessible location storing a plurality of groups of content associated with the item, wherein the network accessible identifier identifies the network accessible location, and further wherein each group of the plurality of groups has a different access requirement such that the network accessible location blocks access to the group unless the access requirement of the group has been satisfied and a non-transitory computer readable medium storing an item agent that controls the communication between the mobile device and the tags and the registry, automatically wirelessly searches for the tags and prompts a user on the mobile device when one of the tags is discovered. In some embodiments, the different access requirements comprise authentication of the item, proof of possession of the item and proof of proximity to the item. In some embodiments, the item agent is configured to satisfy the authentication of the item by reading the unique identifier of the identity tag of one of the items, generate and transmit a challenge message to the identity tag, transmit the unique identifier to the blockchain and access the public key associated with the unique identifier from the blockchain, receive a digital signature from the identity tag and authenticating the item if the digital signature was generated by the private key stored in the identity tag using the accessed public key. In some embodiments, upon receiving the challenge message the identity tag is configured to digitally sign the challenge message thereby generating the digital signature based on the private key stored in the identity tag and transmit the digital signature to the mobile device. In some embodiments, the item agent is configured to satisfy the proof of proximity to the item by automatically wirelessly reading the unique identifier from the identity tag when proximate to the tag, determining from the blockchain the network accessible location identifier associated with the unique identifier read from the tag, attempting to access the network accessible location based on the network accessible location identifier, receiving a proximity challenge from the network accessible location, forwarding the proximity challenge to the identity tag coupled to the item, receiving a digital signature of the proximity challenge from the identity tag that was generated using the private key, forwarding the digital signature to the network accessible location and receiving verification that the proof of proximity is satisfied if the network accessible location determines using the public key that the digital signature was generated by the private key stored in the identity tag. In some embodiments, satisfying the proof of possession of the item comprises the item agent satisfying the access requirement of the proof of proximity to the item a plurality of times over a predetermined time period. In some embodiments, the network accessible location is a cloud server provides cloud services related to the item including information about the item or programs related to the item. In some embodiments, the cloud server is provided by an entity that uploaded the unique identifier and the public key to the blockchain. In some embodiments, the cloud server is provided by a third party appointed by an entity that uploaded the unique identifier and the public key to the blockchain. In some embodiments, the cloud server is a smart contract running on a blockchain database.

A third aspect is directed to a method of accessing a desired group of a plurality of groups of content associated with one or more physical items each having an identity tag coupled to the item, the identity tags each storing a private key and a unique identifier. The method comprises maintaining a network accessible location storing the plurality of groups of content associated with the items, wherein each group of the plurality of groups has a different access requirement such that the network accessible location blocks access to the group unless the access requirement of the group has been satisfied, wirelessly reading the unique identifier from one or more of the identity tags with a mobile device when proximate to the one or more of the tags, identifying the network accessible location from a blockchain with the mobile device, the blockchain associating and storing the unique identifier, a network accessible location identifier and a public key for each of the items, wherein the public key is associated with the private key stored on the identity tag coupled to the item and the network accessible identifier identifies the network accessible location and determining and satisfying the access requirement associated with the desired group of the plurality of groups with the mobile device in order to access the desired group on the mobile device. In some embodiments, the different access requirements comprise authentication of the item, proof of possession of the item and proof of proximity to the item. In some embodiments, satisfying the authentication of the item comprises with the mobile device reading the unique identifier of the identity tag of one of the items, generate and transmit a challenge message to the identity tag, transmit the unique identifier to the blockchain and access the public key associated with the unique identifier from the blockchain, receive a digital signature from the identity tag and authenticating the item if the digital signature was generated by the private key stored in the identity tag using the accessed public key. In some embodiments, upon receiving the challenge message the identity tag is configured to digitally sign the challenge message thereby generating the digital signature based on the private key stored in the identity tag and transmit the digital signature to the mobile device. In some embodiments, satisfying the proof of proximity to the item comprises automatically wirelessly reading the unique identifier from the identity tag with the mobile device when proximate to the tag, determining from the blockchain the network accessible location identifier associated with the unique identifier read from the tag with the mobile device, attempting to access the network accessible location with the mobile device based on the network accessible location identifier, generating and transmitting a proximity challenge to the mobile device with the network accessible location, forwarding the proximity challenge from the mobile device to the identity tag coupled to the item, generating and transmitting to the mobile device a digital signature of the proximity challenge with the identity tag using the private key, forwarding the digital signature from the mobile device to the network accessible location and determining that the proof of proximity is satisfied by verifying the validity of the digital signature with the network accessible location if the digital signature was generated by the private key stored in the identity tag using the public key. In some embodiments, satisfying the proof of possession of the item comprises satisfying the access requirement of the proof of proximity to the item with the mobile device a plurality of times over a predetermined time period. In some embodiments, the network accessible location is a cloud server provides cloud services related to the item including information about the item or programs related to the item. In some embodiments, the cloud server is provided by an entity that uploaded the unique identifier and the public key to the blockchain. In some embodiments, the cloud server is provided by a third party appointed by an entity that uploaded the unique identifier and the public key to the blockchain. In some embodiments, the cloud server is a smart contract running on a blockchain database.

DETAILED DESCRIPTION OF THE INVENTION

Embodiments described herein are directed to an identity verification and authentication system that enables users, devices and machines to verify the identity of things and authenticate them without relying on a third-party-controlled authentication service. The system enables users to authenticate collectable products. The system is able to include wireless tamperproof tags coupled to things and an open registry database where a chain of ownership of the things is able to be stored. As a result, by easily scanning a tag with a device having an authentication application, a user is able to use the system to immediately determine whether the thing coupled to the tag is authentic as well as be provided with a history of ownership and description of the thing to ensure an entity has the right to sell the thing. Thus, the system provides the advantage of thing and purchase certainty in a field of common forgeries. Further, the open registry enables public access to the authentication data combined with a registration protocol that is technology agnostic and having selectable item registration anonymity such that the users do not have to rely on a third party for the authentication while the merchandisers or registrants can register their products without making public on the database to competitors product line roll-out/release quantities. Finally, registration protocol of the open registry is able to enable submission of item data including a network accessible location (link and/or address) that the system can use to access to a cloud service that can serve digital content related to the thing/product or execute programs related to the thing/product.

Figure 1:
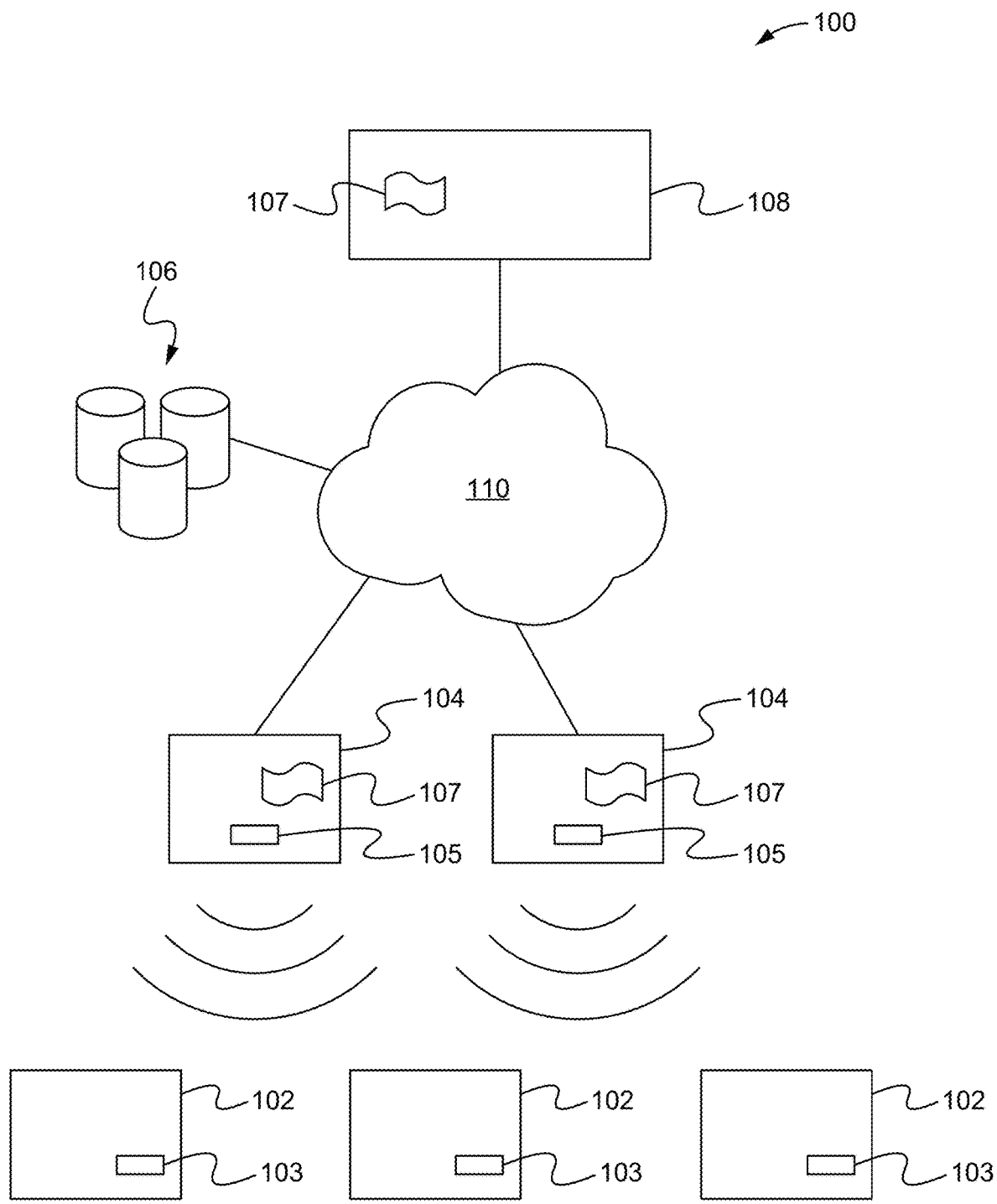
FIG. 1 illustrates an item open registry authentication system according to some embodiments.

FIG. 1 illustrates an item open registry authentication system 100 according to some embodiments. As shown in FIG. 1, the system 100 comprises one or more items 102 each having an identity (and/or authentication) tag 103, one or more computing devices 104 each having a receiver/transmitter 105, an open registry 106 and one or more servers 108, wherein the servers 108, the registry 106 and/or the devices 104 are communicatively coupled via one or more networks 110. Although as shown in FIG. 1, a single server 108 is coupled with two client devices 104, it is understood that any number of servers 108 are able to be coupled with any number of devices 104. The networks 110 are able to be one or a combination of wired or wireless networks as are well known in the art. The one or more servers 108 are able to store at least a portion of an item authentication agent and/or application 107 including a graphic user interface on a memory of one or more of the servers 108. As a result, a user is able to download the application 107 from the servers 108 over the network 110 onto one or more of the devices 104. After being downloaded to the client device 104, the application 107 is able to create and use an application database within the local memory on the device 104 to store and utilize data necessary for operation.

Alternatively, some or all of the data is able to be stored in a server database on the memory on the servers 108 such that the application 107 is able to connect to the servers 108 over the networks 110 in order to utilize the data on the server database. For example, the locally executing application 107 on the devices 104 is able to remotely communicate with the servers 108 over the network 110 to perform any features of the application 107 and/or access any data on the server database not available with just the data on the device 104. In some embodiments, the same data is stored on both the server database and one or more of the devices 104 such that either local or remote data access is possible. In such embodiments, the data on the servers 108 and/or devices 104 is able to be synchronized by the application. In some embodiments, the server database and/or application 107 is distributed across a plurality of the servers 108. Alternatively or in addition, one or more of the servers 108 are able to store all of the database and/or application data. In such embodiments, the servers 108 are able to perform a synchronization process such that all the databases and/or other application data are synchronized.

Alternatively, the application 107 is able to be replaced or supplemented with an item agent and/or website stored on the server memory and executed by the servers 108, wherein the agent and/or website provides some or all of the functionality of the application 107 with a website user interface that is substantially similar to the application user interface. In such embodiments, a device 104 is able to access the agent and/or website and utilize the features of the agent and/or website with a web browser that communicates with the servers 108 over the networks 110. In some embodiments, the functionality of the website is able to be limited to facilitating the downloading of the application 107 onto one or more devices 104. In other words, the application/agent 107 is able to operate on just the servers 108, just the devices 104 or a combination of the servers 108 and devices 104. Accordingly, it should be noted that although described according to an exemplary functional distribution herein, other distributions of the functions of the application/agent 107 between the servers 108 (via the agent/website) and the devices 104 (via the application) are contemplated but not included for the sake of brevity.

Alternatively, the device 104 is able to be an autonomous machine such as a drone or an identity/internet of things (IOT) device. In such embodiments, the application 107 is able to be already installed in the device 104 or is able to be part of the software or firmware operating the device 104 itself.

Further, the servers 108 are able to store item information describing one or more of the items 102 (e.g. text, audio, photos and/or video describing brand/product) and associated with the public key and/or unique identifier stored on the tags 103 coupled to the items 102. As a result, when one of the devices 104 scan/read one or more of the tags 103 on one or more of the items 102, the application on the device 104 is able to communicate the public key and/or the unique identifier of the scanned tags 103 to the server(s) 108, which then are able to provide the item information associated with the key/identifier to the device 104 for display to the user. In some embodiments, the item information is able to comprise one or more links to or addresses of network accessible locations (e.g. uniform resource identifiers), wherein the locations include information about the items. In such embodiments, when one of the devices 104 scan/read one or more of the tags 103 on one or more of the items 102, the application on the device 104 is able to communicate the public key and/or the unique identifier of the scanned tags 103 to the server(s) 108, which then are able to provide the links/addresses enabling the application 107 on the device to access the locations (and the server(s) operating the locations) on the device 104 (e.g. via a web browser). In some embodiments, the item information and associated public keys/unique identifiers are uploaded to the servers 108 during a registration process.

The computing devices 104 are able to be any computing device having a memory for storing at least a portion of the application 107 and a wireless tag reading feature 105 capable of wirelessly reading and/or communicating with the tags 103. In some embodiments, the devices 104 comprise a display (e.g. a touchscreen). Examples of suitable computing devices 104 capable of including the reading feature 105 and/or storing the application 107 include smart jewelry (e.g., smartwatch), a personal computer, a laptop computer, a computer workstation, a server, a mainframe computer, a handheld computer, a personal digital assistant, a cellular/mobile telephone, an IOT device, a smart appliance, a game console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system or any other suitable computing device.

The items 102 are able to be collectibles, IOT devices, apparel, shoes, hand bags, garments or other commonly forged or collectable physical items. For example, the items are able to be a brand name purse or pair of shoes where because of the existence of numerous knockoffs, it can be difficult to prove that the items are authentic for the purpose of transfers/sales from a current owner to a prospective buyer. In some embodiments, the items 102 are also able to be automobiles, vehicles, boats, collectibles and the like.

Figure 2A:
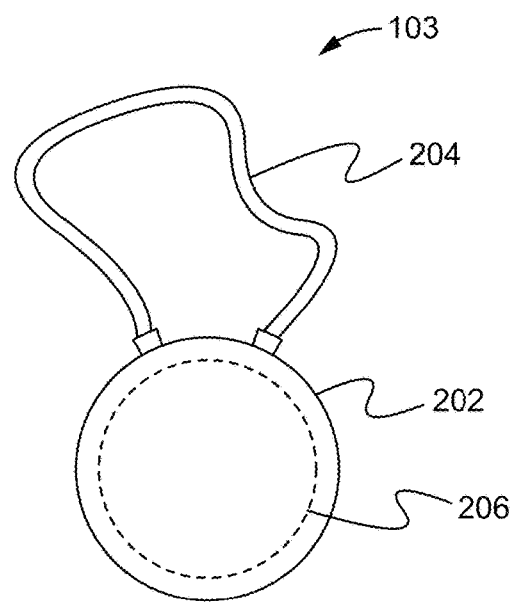
FIG. 2A illustrates a tag according to some embodiments.
Figure 2C:
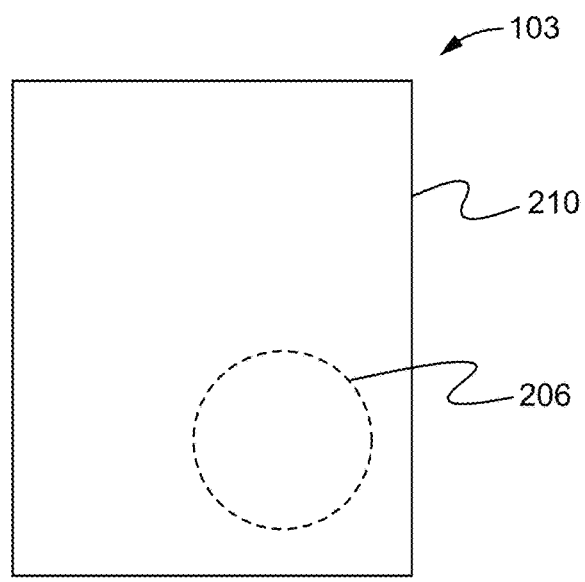
FIG. 2C illustrates a tag according to some embodiments.
Figure 2B:
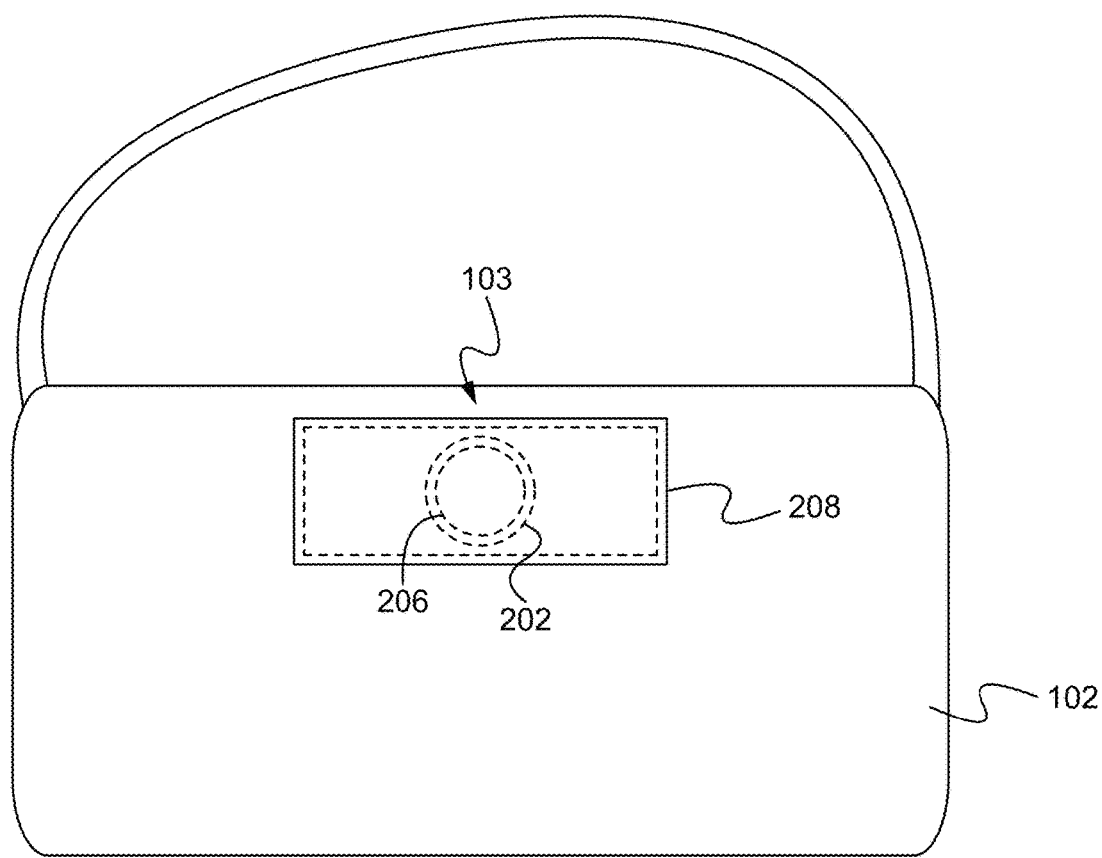
FIG. 2B illustrates a tag according to some embodiments.

FIGS. 2A-C illustrate the tags 103 according to some embodiments. As shown in FIG. 2A, the tag 103 is able to be an external tag that comprises a tamperproof body 202, a tamperproof fastening mechanism 204 (e.g. a ring), with the body 202 housing an authentication circuit 206. The body 202 and/or fastening mechanism 204 are able to be formed by a single contiguous piece of plastic such that the circuit 206 is entirely sealed within the body 202 and/or fastening mechanism 204. As a result, the circuit 206 cannot be physically removed or tampered without breaking the body 202 and/or fastening mechanism 204. Additionally, the body 202 and/or fastening mechanism 204 are able to be coupled with the circuit 206 such that decoupling of the tag 103 from the item 102 damages the circuit 206 such that the circuit 206 is unable to be read and/or transmit any stored data, or the circuit 206 transmits warning data indicating that tampering occurred. As shown in FIG. 2B, the tag 103 is also able to be an internal tag that is substantially similar to the external tag of FIG. 2A except that instead of the fastening mechanism 204 the internal tag is able to be stitched into a label or other material of the item 102. Specifically, the body 202 is able to be entirely enveloped by two pieces/layers of fabric or other material of the item 102 stitched or otherwise coupled together around the body 202 (e.g. like a sealed pouch). In some embodiments, at least one of the layers is able to be a label of the item 102 and include writing describing the item 102 (e.g the brand name). In some embodiments, the body 202 and the circuit 206 within the body 202 of the internal tag is able to be flexible such that the item 102 is able to flex without damaging the tag 103. As shown in FIG. 2C, the tag 103 is able to be an electronic device 210 wherein the circuit 206 is integrated into the circuitry of the electronic device 210. For example, the electronic device 210 is able to be a printed circuit board or other electronics with wireless communication capabilities (e.g. an IOT device). As a result, all embodiments of the tags 103 provide the benefit of ensuring that the identification and authentication data stored on the tags 103 are securely coupled to the proper item 102 for authentication/identification purposes or that tampering with the tags 103 and/or item 102 is easily determined.

The circuit 206 is able to communicate wirelessly via near field communication, bluetooth low energy, radio frequency identification, bluetooth, WiFi or other types of wireless communication known in the art. Further, the circuit 206 is able to be public key infrastructure enabled. Specifically, the circuit 206 is able to store a unique identifier and a private key and wirelessly communicate with the readers 105 of the devices 104. The private key is secret and cannot be read or extracted from the tag 103 (e.g. cannot be read by the reader 105). In contrast, the unique identifier is able to be read by a reader 105 and/or otherwise transmitted from the tag 103 to one or more of the devices 104 when requested by the devices 104. The private key is an encryption key that is associated with a corresponding public key. In other words, the public key and private keys are related such that data encrypted with the public key are only able to be decrypted using the private key and digital signatures generated by the private key are only able to be validated using the public key. As a result, as described in detail below, the private key of each of the tags 103 is able to be used to authenticate the item 102 to which the tag 103 is coupled. Specifically, the circuit 206 is able to digitally sign a challenge message received from a device 104 (via the reader 105) using the private key and transmit the digital signature back to the device 104 for authentication of the item 102. Alternatively, the circuit 206 is able to perform other authentication processes on the challenge message using the private key in response to a challenge message from a device 104.

The unique identifier is able to be the public key (associated with the private key stored on the tag 103), a hash of the public key, a universally unique identifier (UUID) or other unique identifier. Additionally, in some embodiments, the circuit 206 is able to store data related to the item 102 to which the tag 103 is attached (e.g. text, photos, video and/or audio describing the item 102 and/or registrant). In such embodiments, when scanned by the reader 105, the circuit 206 is able to send the item-related data to the application on the device 104 which then automatically presents the data to the user of the device 104.

The open registry 106 stores registry data and is able to be a database, a blockchain, or a smart contract whose records are open to the public (e.g. access to view records is not permission based, but ownership/transfer protocol requirements for making changes to database). For example, the registry 106 is able to be a distributed database (e.g. across a plurality of computing devices that each store copies of transactions in one or more linked blocks) that maintains a continuously-growing list of data records (e.g. descriptions of the items associated with the unique identifiers, provenance or chain of ownership transactions associated with pairs of public keys and unique identifiers) hardened against tampering and revision. In some embodiments, the registry 106 consists of data structure blocks which hold exclusively data (e.g. public keys, ownership data, item identification data) with each block holding batches of individual transactions and the results of any blockchain executables. Alternatively, the blocks are able to store both data and programs. Each block of the blockchain contains a timestamp and information linking it to a previous block thereby defining the chain and maintaining a chronological order of each of the records/transactions. Thus, the registry 106 provides the advantages of, unlike private third party databases which are controlled by the third party and often require permission for data access, the data (e.g. chain of ownership information, other information related to the item associated with the unique identifier) of the open registry 106 is able to be self-controlled (based on the transaction rules inherent to the database) and publically accessible/viewable without any privileged permissions required. Alternatively, the open registry 106 is able to be a non-blockchain database.

The registry data is able to comprise pairs of public keys and item unique identifiers uploaded by registrants or other owners of keys/items. The registrants are able to be manufacturers, authenticators, owners and/or other entities associated with the item 102. The registry data is also able to comprise item information such as network accessible locations (e.g. websites, cloud servers, servers 108) or links thereto. This item information is able to be associated with one or more of the pairs and optionally made accessible or not accessible to the public. Additionally, unlike other databases, the registry 106 is able to enable the upload or creation of new entries of pairs of item identifiers and public keys (e.g. as registered by a registrant that just manufactured the items 102 associated with the identifiers) without also associating data with the pairs that identifies the source of the pairs. In other words, if desired, the registry 106 protects registrants from competitors being able to access the registry 106 and determine the quantity of a new product/item rollout or release based on the number of pairs by shielding the source of the pairs from public view. In some embodiments, the shielding is in the form of preventing public access to associated source data. Alternatively, the shielding is able to be in the form of enabling the registration of new pairs without any source information such that even if all the data was publicly accessible the registry 106 does not include any source information (that is associated with the pairs) to be accessed. Alternatively, the registry 106 is provides the registrants the option to include the source information such that the source information is publically associated with the new pairs.

Also, as described above, the item information data uploaded by a registrant onto the registry 106 along with the pairs is able to comprise one or more links to or addresses of network accessible locations (e.g. uniform resource identifiers), wherein the locations (e.g. a cloud, website) include information about the items. In such embodiments, when one of the devices 104 scan/read one or more of the tags 103 on one or more of the items 102, the application 107 on the device 104 is able to communicate the public key and/or the unique identifier of the scanned tags 103 to the registry 106 in order to retrieve the associated network accessible location(s). In some embodiments, subsequent access or the level of access provided to the network accessible location is determined based on an authentication, a proof of proximity, a proof of possession, and/or a proof of ownership process as described below. As a result, the registrants are able to limit access to the locations unless a device 104 is able to prove that the item is authentic and/or that the device 104 is in proximity, possession and/or ownership to/of the item 102 as well as help provide the source shielding described above. Alternatively or in addition, the item information and associated public keys and/or unique identifiers are uploaded to the servers 108 and/or devices 104 during a registration process as described in detail below.

The application 107 is able to comprise an authentication module, a proximity module and a description module, wherein the application 107 and the modules use the application database to store, maintain and access data necessary for the operation of the application 107. The authentication module is able to automatically perform the authentication process described below when a device 104 reads one of the tags 103 coupled to an item 102. Similarly, the description module is able to provide an item description on the device 104 also upon reading one of the tags 103. In particular, the description module is able to access the item information stored on the device 104 and/or the servers 108 as described above.

Additionally, in some embodiments the application is able to comprise a login and registration module and a payment module, wherein the application user interface is configured to enable users to utilize the application modules. The login and registration module enables a user to create a user profile/account by inputting username and password information via the graphical user interface that is then associated with the account such that the information is able to be used to identify the user when logging onto the application. Alternatively, the login information is able to be omitted and a user is able to use the application without creating a user account or logging in. After a user account is created, the user is able to access the account by entering the username and password in order to identify themselves to the application. In some embodiments, during the creation of the account or subsequently, additional information is able to be stored and associated with the account such as, but not limited to, contact information (e.g. phone number, email, address), submitted content (e.g. item images, descriptions), account privileges/subscription information (e.g. unlocked application features), friends or other trusted accounts on the system and payment information. In some embodiments, the additional information is submitted by a user upon logging into the account. Alternatively, some or all of the additional information is able to be applied to the account automatically by the application based on interactions by the user with the application.

Figure 3:
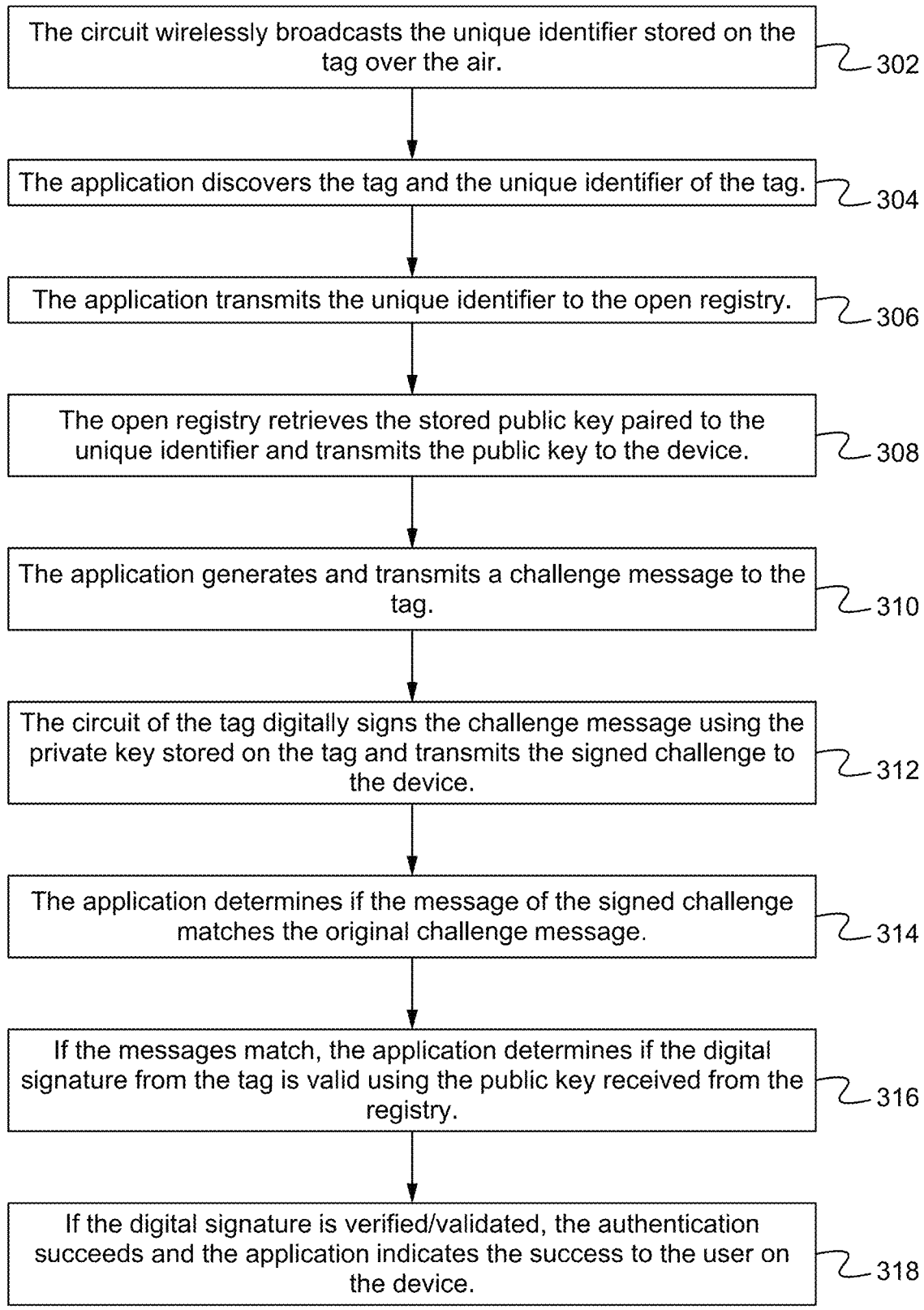
FIG. 3 illustrates a flow chart of an item authentication method using the system according to some embodiments.
Figure 8:
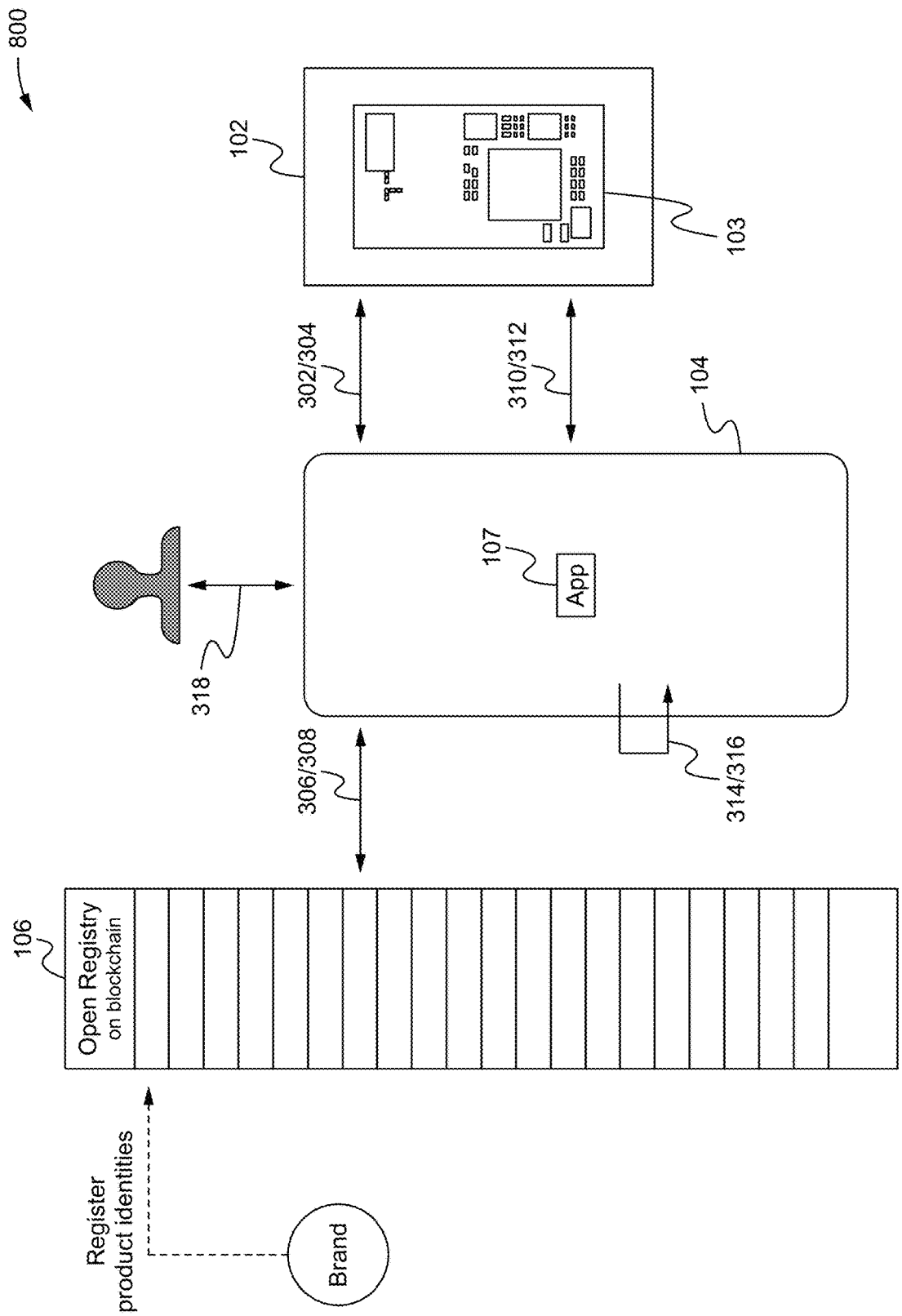
FIG. 8 illustrates flow diagram of an item authentication method using the system according to some embodiments.

FIGS. 3 and 8 illustrate a flow chart and a flow diagram 800 of an item authentication method using the system 100 according to some embodiments. As shown in FIGS. 3 and 8, the circuit 206 of the tag 103 on an item 102 wirelessly broadcasts the unique identifier stored on the tag 103 over the air at the step 302. Alternatively, the circuit 206 is able to only broadcast after being interrogated by a reader (e.g. the application 107 of a device 104). The application 107 of a device 104 in proximity of the tag 103 discovers the tag 103 and the unique identifier of the tag 103 at the step 304. In some embodiments, the application 107 provides an authentication option of the authentication module to a user on the device 104 and automatically/continuously monitors for tags 103 (and/or the associated identifiers) to discover when the authentication option is selected. Alternatively, the application 107 is able to automatically monitor for tags 103 (and/or identifiers) and displays the authentication option of the authentication module on the device 104 when a tag 103 (and/or identifier) is discovered. In such embodiments, the application 107 is able to await selection of the authentication option before proceeding with the remainder of the method steps. After receiving the unique identifier, the application 107 on the device 104 transmits the unique identifier to the open registry 106 over the network 110 at the step 306. Upon receiving the unique identifier, the open registry 106 retrieves the stored public key paired to the unique identifier that matches the received unique identifier and transmits the public key to the device 104 over the network 110 at the step 308. Additionally, in some embodiments the registry 106 is able to transmit the chain of ownership or other item related data (e.g. the current owner) associated with the unique identifier to the device 104. If no pairs match the received unique identifier, the authentication fails and the registry 106 instead sends a failure message to the device 104 which then indicates the failure on the device 104 to the user via the application 107. In some embodiments, a brand or other entity registers the unique identifier, public key and other information associated with the item 102 onto the registry 106 prior to the request from the device 104.

After or concurrently with steps 306 and 308, the application 107 on the device 104 generates and transmits a challenge message (e.g. a random data set, a data set received from the registry 106) to the tag 103 at the step 310. Upon receiving the challenge message, the circuit 206 of the tag 103 digitally signs the challenge message using the private key stored on the tag 103 and transmits the signed challenge (e.g. the digital signature and the challenge message) to the device 104 via the reader 105 at the step 312. In some embodiments, the digital signature is a hash of the challenge message using the private key. Alternatively, the digital signature is able to be other modulations of and/or operations performed on the message using the private key.

The application 107 determines if the message of the signed challenge matches the original challenge message at the step 314. If the messages do not match, the authentication fails and the application 107 indicates the failure to a user on the device 104. If the messages match, the application 107 determines if the digital signature from the tag 103 is valid using the public key received from the registry 106 at the step 316. In some embodiments, determining if the digital signature if valid comprises generating a public signature using the public key and the challenge message and determining if it matches or corresponds to the digital signature. Alternatively, other signature validation methods are able to be used based on the public key and the challenge message. Alternatively, the open registry 106 is able to perform some or all of the signature validation. Specifically, the open registry 106 is able to receive the challenge message from the device 104 and generate and send a public signature based on the public key and the challenge message to the application 107. In such embodiments, the application 107 only needs to determine if the public signature matches or corresponds to the digital signature from the tag 103 in order to determine if the digital signature if valid. Alternatively, the application 107 is able to further forward the signed message (e.g. the digital signature and the challenge message) received from the tag 103 to the registry 106 such that all the validation is performed by the registry 106 which then indicates to the device 104 whether the authentication was a success. Alternatively, a third party server (e.g. brand/company server) associated with the application is able to perform some or all of: provide the challenge message, generate the public signature, receive and compare the signed response to the public signature to determine if the digital signature is valid (e.g. wherein any remaining functions are performed by the application 107 and/or registry 106). As a result, in such embodiments, the third party server is able to only provide access to content (e.g. item information) associated with the item 102 if the item 102 is authenticated to the third party server.

If the digital signature is not verified or validated using the public key, the authentication fails and the application 107 indicates the failure to a user on the device 104. If the digital signature is verified/validated, the authentication succeeds and the application 107 indicates the success to the user on the device 104 at the step 318. As a result, the method provides the advantage of enabling a user to authenticate that the item 102 is genuine and/or the current owner of the item 102. In some embodiments, indicating the success to the user on the device 104 comprises presenting (or provided access to) the chain of ownership information and/or the item information (e.g. stored on the device 104, the servers 108 or both) corresponding to the item 102 to the user on the device 104 using the description module. In such embodiments, the presenting of the item information is able to comprise the automatic navigation to a network accessible address of the item information (e.g. via the application 107 or a web browser) and/or the presentation of a link to the network accessible address to a user. In some embodiments, the method further comprises obtaining proof of ownership data from a user and authenticating the proof of ownership data based on the records and/or protocols of the registry 106 in order to authenticate the ownership. In such embodiments, the application 107 is able to indicate successful authentication of ownership to the user on the device 104. In some embodiments, the authentication method is used by IOT devices and autonomous machines to recognize objects and execute their programmed behavior accordingly. In some embodiments, the authentication method is used by IOT devices and autonomous machines to recognize other IOT devices and machines and engage them accordingly to their programs, including performing a task and establishing a connection/communication.

Figure 4:
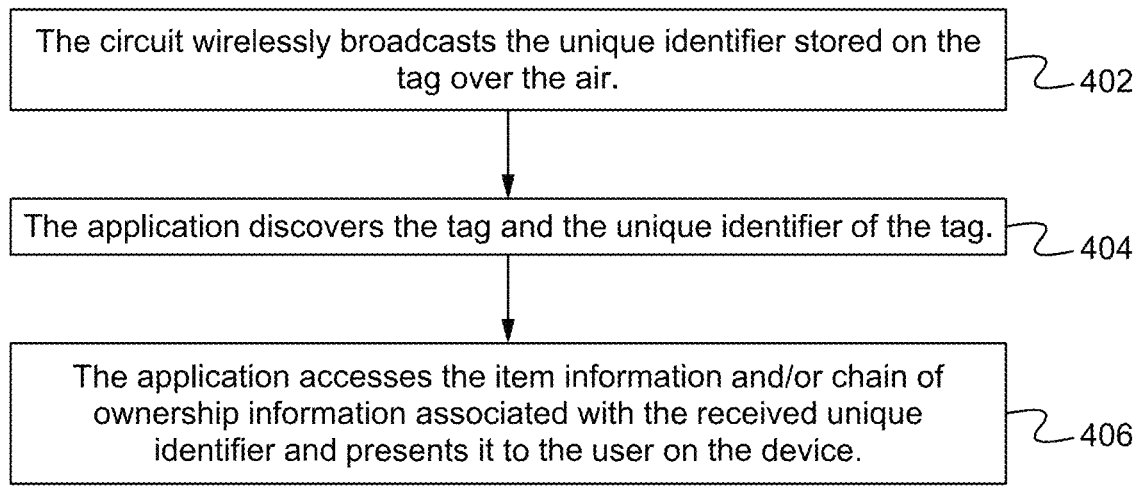
FIG. 4 illustrates a method of presenting item information according to some embodiments.

FIG. 4 illustrates a method of presenting item information according to some embodiments. As shown in FIG. 4, the circuit 206 of the tag 103 on an item 102 wirelessly broadcasts the unique identifier stored on the tag 103 over the air at the step 402. Alternatively, the circuit 206 is able to only broadcast after being interrogated by a reader (e.g. the application 107 of a device 104). The application 107 of a device 104 in proximity of the tag 103 discovers the tag 103 and the unique identifier of the tag 103 at the step 404. In some embodiments, the application 107 provides an authentication option of the authentication module to a user on the device 104 and automatically/continuously monitors for tags 103 (and/or the associated identifiers) to discover when the authentication option is selected. Alternatively, the application 107 is able to automatically monitor for tags 103 (and/or identifiers) and displays the authentication option of the authentication module on the device 104 when a tag 103 (and/or identifier) is discovered. In such embodiments, the application 107 is able to await selection of the authentication option before proceeding with the remainder of the method steps. After receiving the unique identifier, the application 107 on the device 103 accesses the item information (on the device 104 and/or the servers 108) and/or chain of ownership information associated with the received unique identifier and presents the chain of ownership information and/or the item information to the user on the device 104 using the description module at the step 406. In some embodiments, the presenting of the item information is able to comprise the automatic navigation to a network accessible address of the item information (e.g. via the application 107 or a web browser) and/or the presentation of a link to the network accessible address to a user on the device 104. Alternatively or in addition, the presenting of the item information is able to comprise accessing the item information associated with the unique identifier on the servers 108, locally on the device 104 and/or on the open registry 106 over the network 110. As a result, the method provides the advantage of enabling a user to quickly find authenticated information about an item and/or be forwarded to a location (e.g. website) with information about the item.

Figure 5:
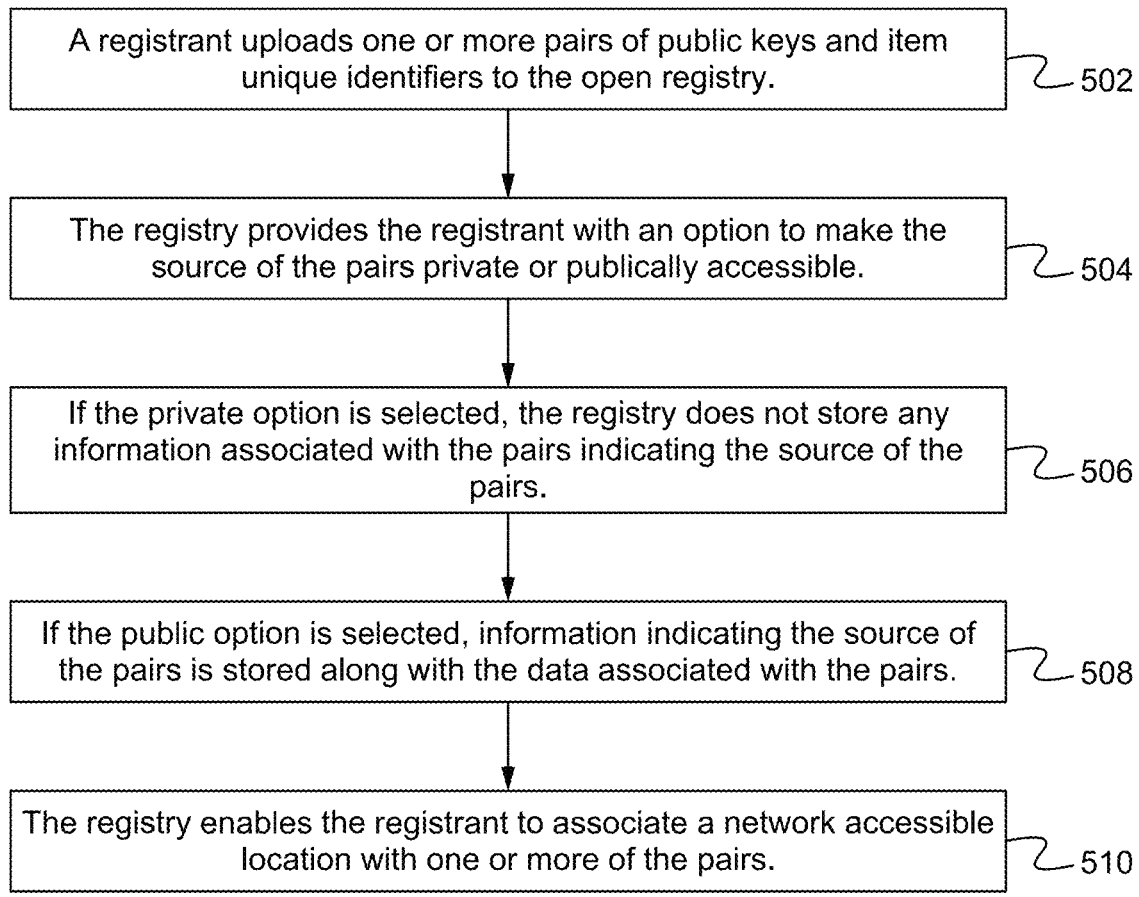
FIG. 5 illustrates a method of registering items on the open database according to some embodiments.

FIG. 5 illustrates a method of registering items 102 on the registry 106 according to some embodiments. As shown in FIG. 5, a registrant uploads one or more pairs of public keys and item unique identifiers to the open registry 106 over the network 110 at the step 502. The public keys correspond to the private keys stored in the tags 103 along with the item unique identifiers to which the public keys are paired. The registry 106 provides the registrant with an option to make the source (e.g. the registrant or owner) of the pairs private or publically accessible at the step 504. If the private option is selected, the registry 106 does not store any information associated with the pairs indicating the source of the pairs at the step 506. If the public option is selected, information indicating the source of the pairs is stored along with the data associated with the pairs (e.g. optional chain of ownership data, other item information data) at the step 508.

The registry 106 enables the registrant to associate a network accessible location (e.g. cloud server, website, server 108) with one or more of the pairs at the step 510. In some embodiments, the network accessible location requires item authentication, proof of proximity, proof of possession and/or proof of ownership as described below, before enabling access to digital content and/or executing services or programs related to the pairs provided by the network accessible location. Thus, the registration method provides the advantage of enabling owners or registrants to remain anonymous if desired and/or to restrict access to a network accessible location associated with the items 102 (associated with the uploaded pairs) unless a proof of proximity, authentication, possession and/or ownership process is completed. Thus, the method enables the registrants to protect themselves from competitive product size release determination while still utilizing an open registry 106.

Figure 6:
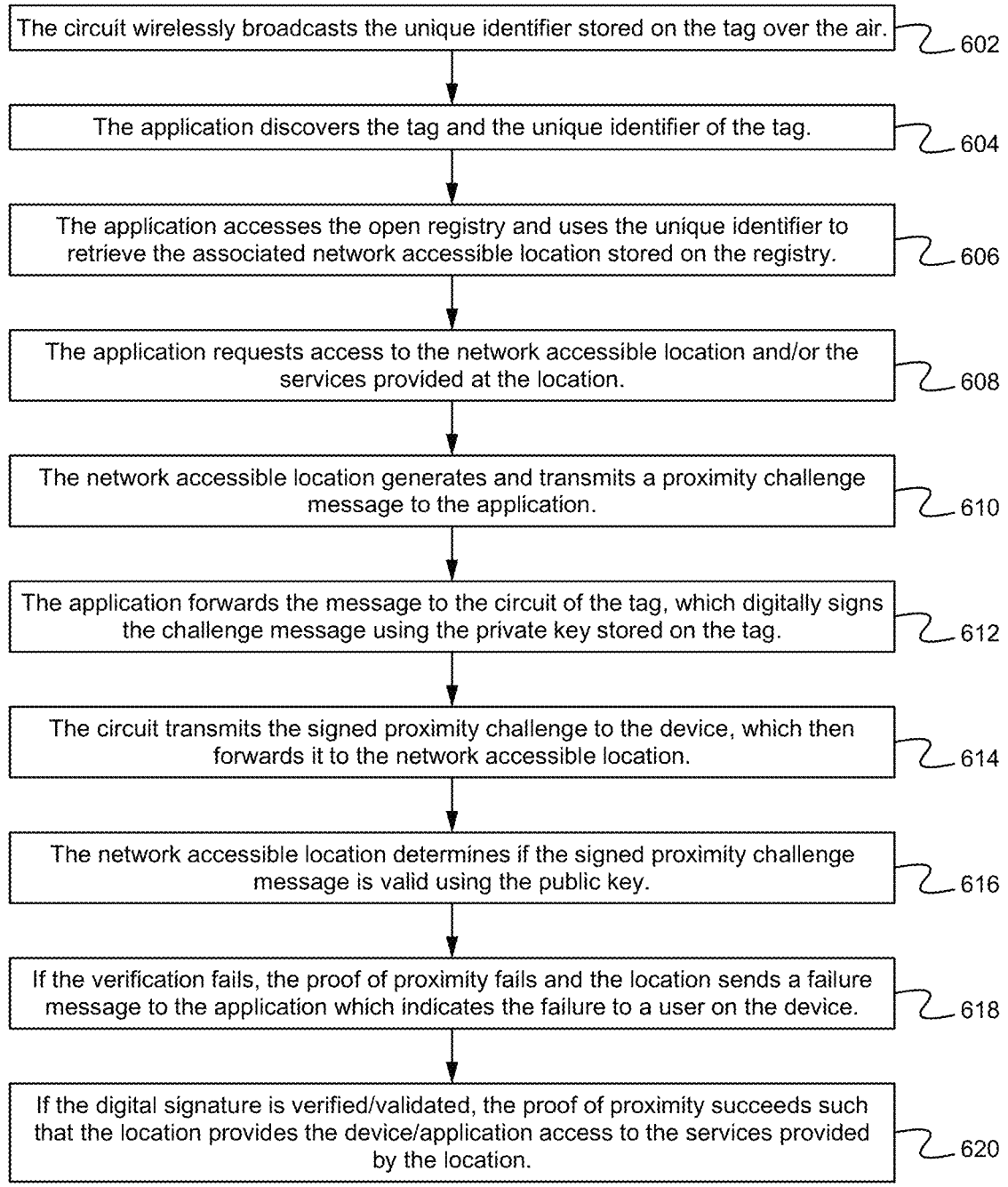
FIG. 6 illustrates a flow chart of a proof of proximity method according to some embodiments.
Figure 9:
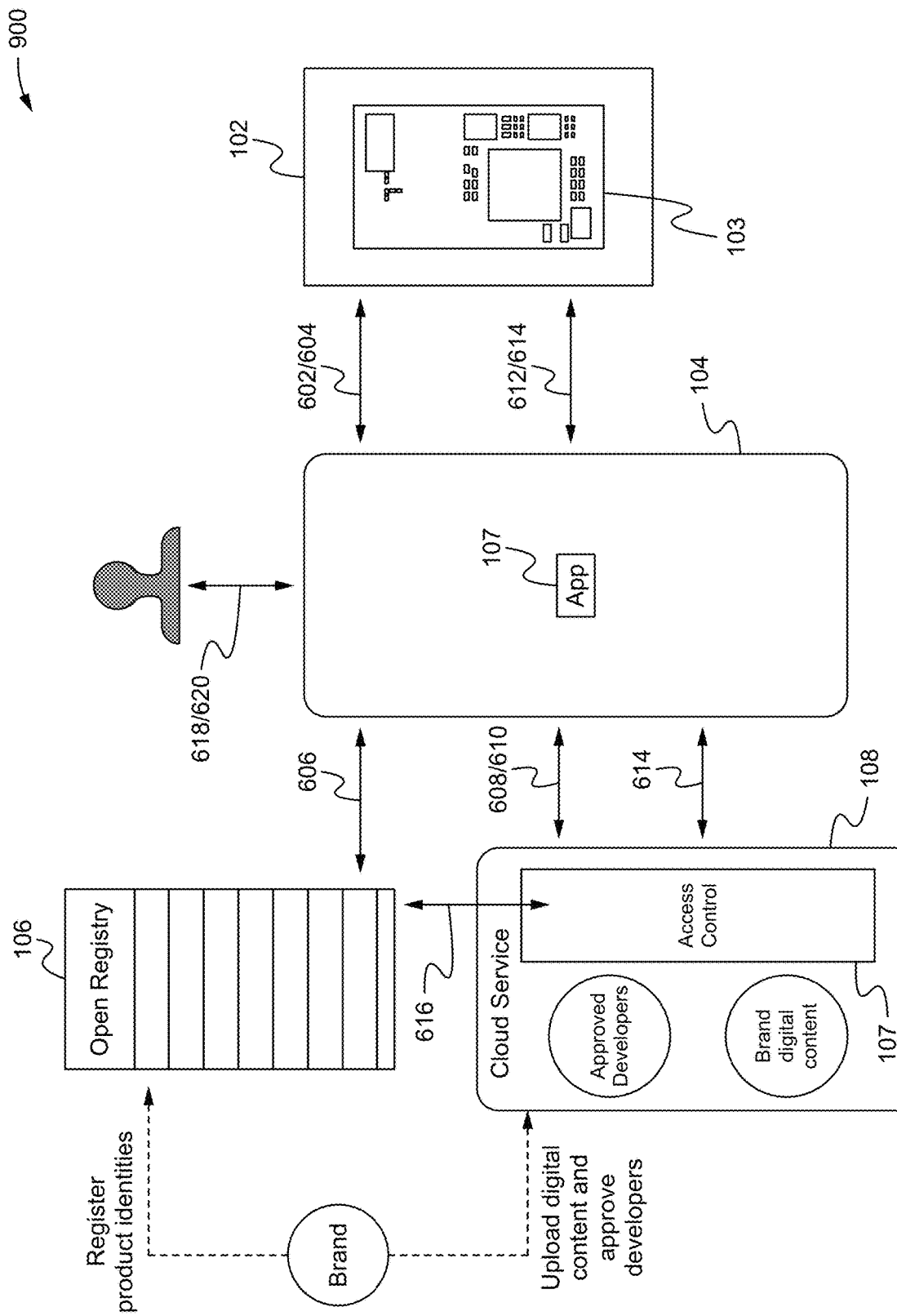
FIG. 9 illustrates flow diagram of a proof of proximity method according to some embodiments.

FIGS. 6 and 9 illustrate a flow chart and a flow diagram 900 of a proof of proximity method according to some embodiments. As shown in FIGS. 6 and 9, the circuit 206 of the tag 103 on an item 102 wirelessly broadcasts the unique identifier stored on the tag 103 over the air at the step 602. Alternatively, the circuit 206 is able to only broadcast after being interrogated by a reader (e.g. the application 107 of a device 104). The application 107 of a device 104 in proximity of the tag 103 discovers the tag 103 and the unique identifier of the tag 103 at the step 604. In some embodiments, the application 107 provides a proof of proximity option of the proof of proximity module to a user on the device 104 and automatically/continuously monitors for tags 103 (and/or the associated identifiers) to discover when the proof of proximity option is selected. Alternatively, the application 107 is able to automatically monitor for tags 103 (and/or identifiers) and displays the proof of proximity option of the proof of proximity module on the device 104 when a tag 103 (and/or identifier) is discovered. In such embodiments, the application 107 is able to await selection of the proof of proximity option before proceeding with the remainder of the method steps. In some embodiments, the proof of proximity and authentication options are able to be presented simultaneously and/or concurrently by the application 107 such that a user is able to select whether they want to perform an authentication method, proximity method, or both on the discovered tag 103.

After receiving the unique identifier, the application 107 accesses the open registry 106 and uses the unique identifier to retrieve the associated network accessible location stored on the registry 106 at the step 606. Additionally, in some embodiments the application 107 is able to concurrently access the other data (e.g. chain of ownership and/or other item information data) associated with the unique identifier on the registry 106. If no pairs match the received unique identifier, the proof of proximity fails and the device 104 indicates the failure on the device 104 to the user via the application 107. Alternatively, if the network accessible location and associated unique identifier is stored on the servers 108 and/or the device 104, the application 107 on the device 104 is able to omit the communication with the registry 106 and instead obtain the network accessible location associated with the unique identifier locally or in the same manner from the servers 108. In some embodiments, a brand or other entity registers the unique identifier, public key and other information associated with the item 102 with the registry 106, approves developers and/or develops digital content (e.g. item information) on the server 108 (e.g. cloud service) prior to the request from the device 104.

The application 107 requests access to the network accessible location and/or the services provided at the location at the step 608. In some embodiments, the services comprise one or more of digital content, raw data, execution of a program or other services related to the unique identifier (and/or the item 102 coupled to the tag 103). The network accessible location (e.g. cloud server, website server, server 108) generates and transmits a proximity challenge message to the application 107 on the device 104 in response to the access request at the step 610. In some embodiments, the proximity challenge message is able to be similar to the authentication challenge message described above. For example, the proximity challenge message is able to be a random string, the unique identifier or other data sets. Upon receiving the proximity challenge message, application 107 on the device 104 forwards the message to the circuit 206 of the tag 103, which digitally signs the challenge message using the private key stored on the tag 103 at the step 612. The circuit 206 then transmits the signed proximity challenge (e.g. the digital signature and the challenge message) to the device 104 via the reader 105 which then forwards it to the network accessible location via the network 110 at the step 614. In some embodiments, the digital signature is a hash of the challenge message using the private key. Alternatively, the digital signature is able to be other modulations of or operation on the message using the private key.

The network accessible location determines if the signed proximity challenge message is valid using the public key at the step 618. In some embodiments, the network accessible location locally stores a copy of the public key paired with the unique identifier. Alternatively, the location is able to request/receive the public key from the registry 106, the servers 108, the device 104 or a combination thereof. The verification of the signed challenge is able to be performed in the same manner as the verification of the signed authentication message described above in the item authentication method. Specifically, the network accessible location is able to determine validity if both the signed challenge matches the original proximity challenge message and the submitted signature validates against the public key associated with the private key of the tag 103. If the verification fails (e.g. due to the messages not matching and/or due to the signature being incorrect), the proof of proximity fails and the location sends a failure message to the application 107 which indicates the failure to a user on the device 104 at the step 618. If the digital signature is verified/validated, the proof of proximity succeeds such that the location provides the device/application 104/107 access to the services provided by the location at the step 620. The application 107 is then able to provide the user with access to the services via the device 104. As a result, the method provides the advantage of enabling registrants to require a proof of proximity before providing access to item related information and/or features from a network accessible location. Indeed, this also serves to help ensure the anonymity of the registry 106 as the item related information (which likely indicates the source/registrant of the item 102) is able to be separate from the data on the open registry 106 (such that it is shielded from the public).

In some embodiments, the network accessible location is able to restrict access based on the proof of proximity method combined with other protocols (e.g. developer tokens, user authentication) such that both must be satisfied for access to be granted. In some embodiments, the network accessible location is a smart contract operating on a blockchain database (e.g. the registry 106). In some embodiments, the providing access to the content/features of the location is able to comprise the automatic navigation to the network accessible address by the device 104 (e.g. via the application 107 or a web browser) and/or the presentation of a link to the network accessible address on the device/application 104/107 to a user. In some embodiments, the application 107 on the device 104 and/or the servers 108 (or other third party servers associated with the application 107 or item 102) are able to perform the verification of the signed proximity challenge message. In such embodiments, if performed on the device 104 the signed message does not need to be forwarded and instead the public key is requested/received from the registry 106 and/or the network accessible location to perform the verification. Similarly, if performed by the servers 108 (e.g. by the agent/application 107 on the servers 108), the signed message is forwarded to the servers 108 which either currently store or request/receive the public key from the registry 106 and/or the network accessible location to perform the verification. The network accessible location described herein is able to refer to the address itself and/or the computers/servers operating the website and/or other services provided at the network accessible location.

In some embodiments, the application 107 is able to comprise a possession module and an ownership module, wherein the application 107 and the modules use the application database to store, maintain and access data necessary for the operation of the application 107. The options to initiate the possession and ownership process is able to be presented to a user on the device 104 in the same manner as the authentication and proof of proximity options as described above. The possession module is able to automatically perform the a possession process wherein a user establishes possession of the item 102 by performing the authentication and/or proof of possession process (described above) multiple times (e.g. 3 times) over a threshold period (e.g. 7 days). In particular, a brand/company/entity associated with the item 102, the server 108 and/or the application 107 is able to set a threshold of times that the authentication and/or proximity process must be validly performed and/or a time period that the threshold must span (e.g. from the first process to the last process and/or a time period between each process).

The brand/company/entity is then able to condition access to content (e.g. item information, features of the application 107 and/or access/use of the network accessible location) on successful completion of the proof of possession. Similarly, the ownership module is able to automatically perform the an ownership process wherein a user establishes possession of the item 102 and/or entitlement to the item 102 based on the chain of custody information stored on the registry 106 for the item 102. Alternatively, the ownership process is able to be the same as the possession process except with an increase in the number of times and/or threshold period over that of the possession process. As a result, as described above, the network accessible location is able to restrict access to one or more features/content (e.g. features/content associated with the item 102) based on whether a device 104 and associated user have established authentication, proximity, possession and/or ownership as described above.

Some examples of features/content include photos, videos, operating manuals, promotions, timelines of ownership, social interactions, "write privileges" to comment socially on the item 102 (e.g. on the application 107, server 108 and/or an associated website), update the item 102 timeline, transfer/sell the item 102, list the item 102 for sale on a secondary market, privileges to receive a trade-in opportunity or limited edition release associated with the item 102 and/or other types of content. Other examples include enabling a consumer to post to a social network their interactions with an item 102 (e.g. like, comment, and/or sign the digital guest book of the item 102) from their smart phone device (e.g. device 104), only if they are able to prove proof of proximity.

In some embodiments, the content is able to be sales/promotions that are unique to the item 102 even amongst other items 102. For example, a discount could be offered on a new pair of shoes, wherein the discount is only available to the user/device 104 that authenticates, proves proximity, proves possession and/or proves ownership of a specific item 102 (e.g. designer purse) even among users/devices 104 that are able to do the same with other items 102 of the same brand/model. As a result, the content provided can be truly unique to one specific item 102 even amongst other duplicate of the item.

In some embodiments, the application 107 is able to comprise an analytics module, wherein the application 107 and the modules use the application database to store, maintain and access data necessary for the operation of the application 107. The options to initiate the analytics function is able to be presented to a user on the device 104 in the same manner as the authentication and proof of proximity options as described above. The analytics module is able to automatically track usage and location data about the items 102 and the devices 104 based on the authentication, proximity, possession and/or ownership processes.

Figure 7:
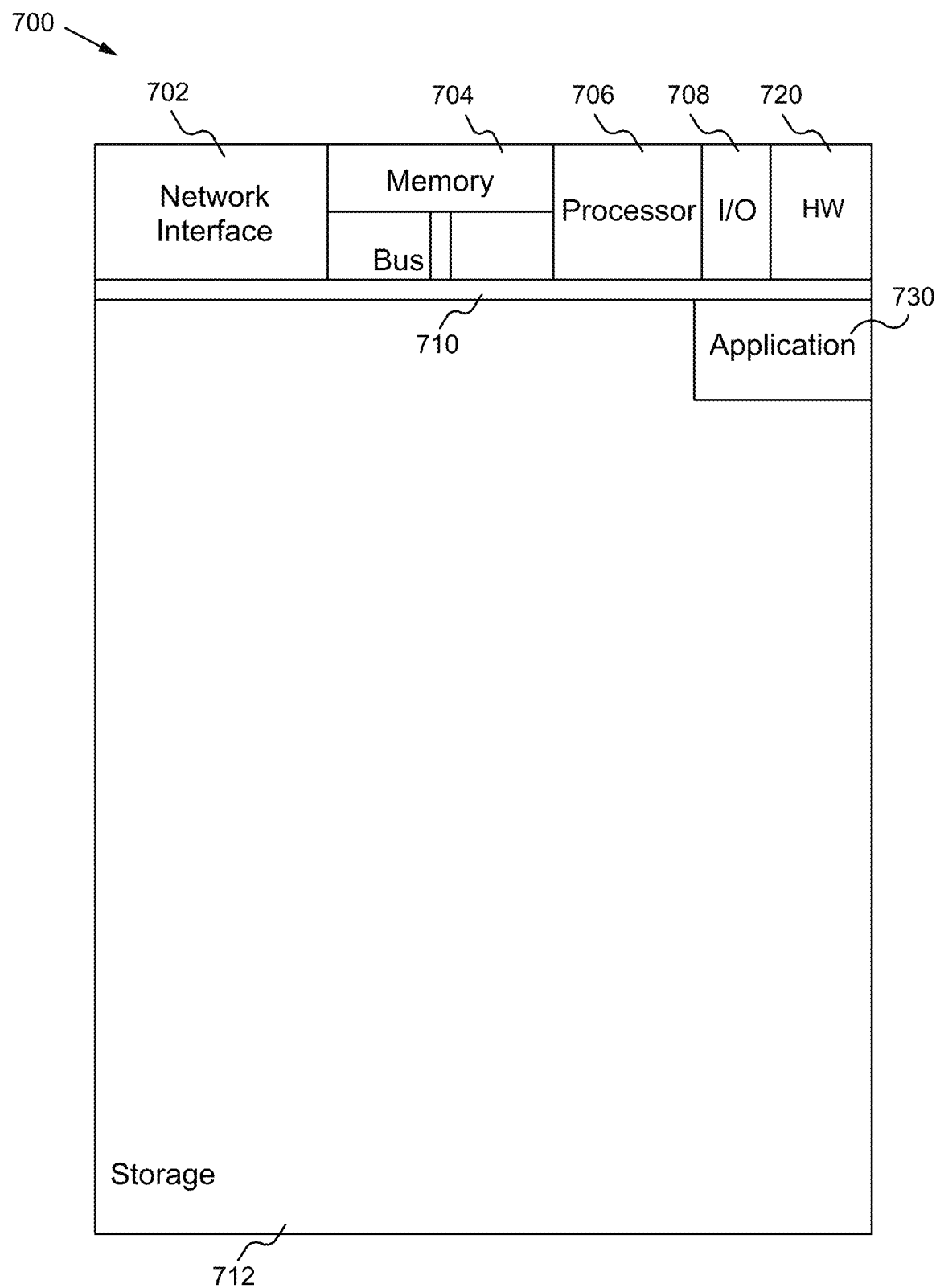
FIG. 7 illustrates a block diagram of an exemplary computing device configured to implement the system according to some embodiments.

FIG. 7 illustrates a block diagram of an exemplary computing device 700 configured to implement the system 100 according to some embodiments. In addition to the features described above, the computing devices 104 and/or servers 108 are able to be substantially similar to the device 700. In general, a hardware structure suitable for implementing the computing device 700 includes a network interface 702, a memory 704, a processor 706, I/O device(s) 708 (e.g. reader 105), a bus 710 and a storage device 712. Alternatively, one or more of the illustrated components are able to be removed or substituted for other components well known in the art. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, display, printer, modem, touchscreen, button interface and other devices. Authentication system application 107 or module(s) thereof are likely to be stored in the storage device 712 and memory 704 and processed as applications are typically processed. More or fewer components shown in FIG. 7 are able to be included in the computing device 700. In some embodiments, authentication system hardware 720 is included. Although the computing device 700 in FIG. 7 includes applications 730 and hardware 720 for the authentication system, the authentication system is able to be implemented on a computing device in hardware, firmware, software or any combination thereof.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. An internet of things (IoT) system for item identity verification of a plurality of physical items, wherein for each of the plurality of the physical items, an identity tag is coupled to the physical item and the physical item is associated with a network accessible location running on at least one server and the network accessible location is a website, comprising:
   an identity tag comprising a circuit for storing a private key and a unique identifier of the identity tag;
   an open registry blockchain, wherein the open registry blockchain comprises an open registry processor and an open registry memory and the open registry blockchain stores an entry of the physical item, wherein the entry comprises the unique identifier of the identity tag, a public key of the identity tag, an identifier of the network accessible location and a chain of ownership, wherein the public key is associated with the private key stored on the identity tag coupled to the physical item;
   the identity tag for broadcasting the unique identifier of the identity tag;
   a mobile device, wherein the mobile device comprises a wireless reader, a mobile device processor and a mobile device memory storing mobile device program instructions that when executed by the mobile device processor causes the mobile device processor to perform the steps of:
      monitoring the identity tag and receiving the unique identifier of the identity tag;
      transmitting the unique identifier to the open registry blockchain;
      receiving the public key associated with the unique identifier from the open registry blockchain;
      generating and transmitting a challenge message to the identity tag;
   the identity tag for:
      generating a first digital signature by signing the challenge message with the private key;
      sending the first digital signature and the signed challenge message to the mobile device;
   the mobile device memory stores additional mobile device program instructions that when executed by the mobile device processor causes the mobile device processor to perform the steps of:
      receiving the digital signature from the identity tag;
      authenticating the physical item by verifying the first digital signature;
      retrieving the identifier of the network accessible location from the open registry blockchain using the unique identifier based on the verification of the digital signature; and
      accessing and presenting the network accessible location of the physical item using the retrieved identifier of the network accessible location.

2. The system of claim 1, wherein the mobile device memory further comprises an ownership module and stores additional mobile device program instructions that when executed by the mobile device processor causes the mobile device processor to perform the steps of:
   retrieving, using the ownership module, the chain of ownership from the open registry blockchain using the unique identifier based on the verification of the digital signature;
   presenting, using the ownership module, the chain of ownership of the physical item.

3. The system of claim 1, further comprising:
   the at least one server comprising an at least one server processor and a non-transitory computer-readable medium storing at least one server program instructions that when executed by the at least one server processor causes the at least one server processor to perform the step of:
      storing the identifier of the network accessible location and access requirements of the physical item, wherein the access requirements comprises authentication of the physical item, proof of proximity to the physical item and proof of possession of the physical item;
   wherein the mobile device memory further stores a proximity module, and
   wherein the accessing the network accessible location of the physical item comprises:
      accessing, using the proximity module, the network accessible location of the physical item;
   the at least one server memory storing additional server program instructions that when executed by the at least one server processor causes the at least one server processor to perform the step of:
      generating and transmitting a proximity challenge message to the mobile device in response to the mobile device accessing the network accessible location;
   the mobile device memory storing additional mobile device program instructions that when executed by the mobile device processor causes the mobile device processor to perform the steps of:

sending the proximity challenge message to the identity tag;

the identity tag for:

generating a second digital signature by signing the proximity challenge message with the private key;

sending the second digital signature and the signed proximity challenge message to the mobile device;

the mobile device memory storing additional mobile device program instructions that when executed by the mobile device processor causes the mobile device processor to perform the step of:

sending the second digital signature and the signed proximity challenge message to the at least one server;

the non-transitory computer-readable medium stores additional at least one server program instructions that when executed by the at least one server processor causes the at least one server processor to perform the steps of:

retrieving the public key of the identity tag from the open registry blockchain;

authenticating the signed proximity challenge message with the public key of the identity tag;

providing the mobile device access to the network accessible location based on the verification of the digital signature.

4. The system of claim 3, wherein the at least one server is a cloud server.

5. The system of claim 4, wherein the cloud server has an association with an entity that uploaded the unique identifier and the public key to the open registry blockchain.

6. The system of claim 4, wherein the cloud server has an association with a third party that is not an entity that uploaded the unique identifier and the public key to the blockchain.

* * * * *